Dec. 27, 1960     N. J. LASKY     2,965,995
FISHING LINE CASTING DEVICE
Filed May 18, 1959
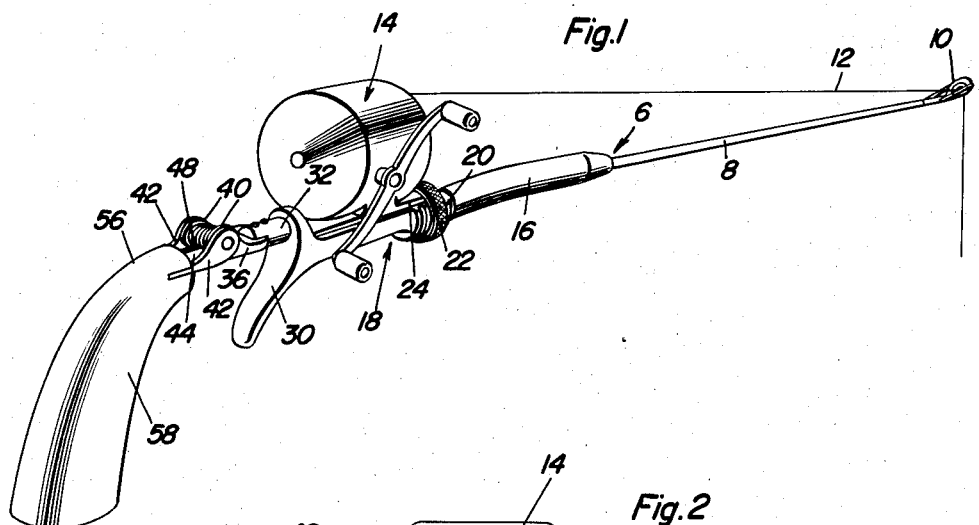
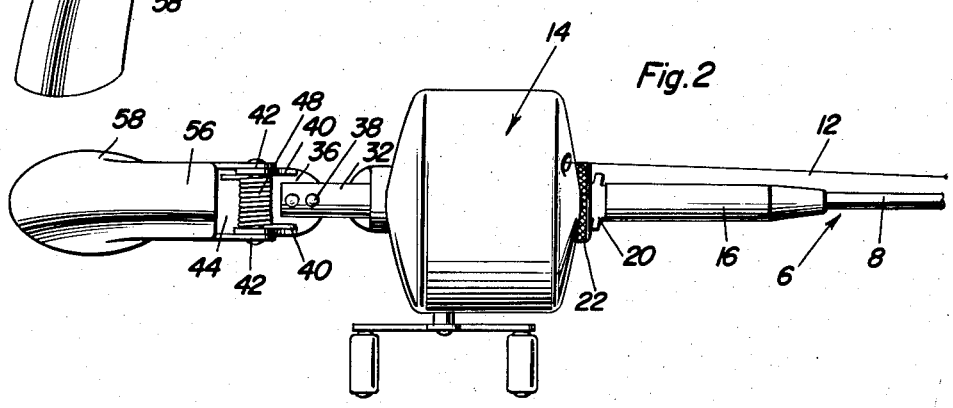
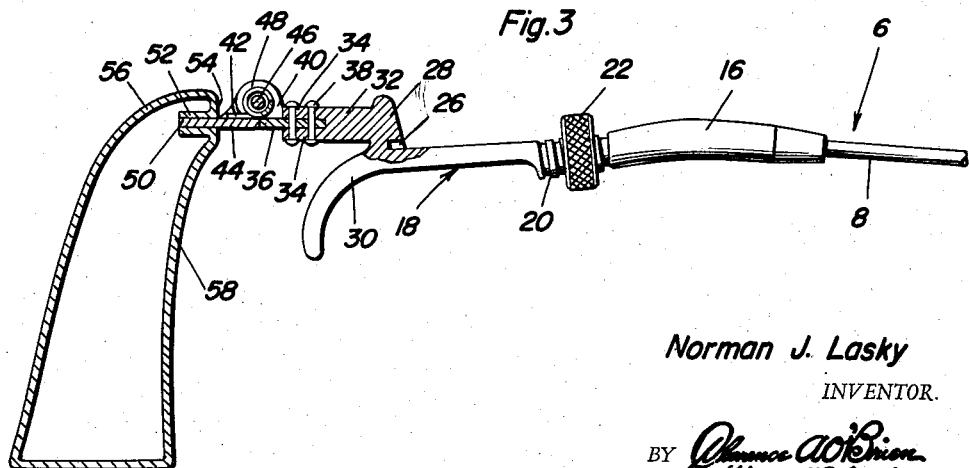
Norman J. Lasky
INVENTOR.
BY *Clarence A. O'Brien*
*and Harvey B. Jackson*
Attorneys

United States Patent Office 2,965,995
Patented Dec. 27, 1960

2,965,995

FISHING LINE CASTING DEVICE

Norman J. Lasky, Main St., Steven's Point, Wis.

Filed May 18, 1959, Ser. No. 814,074

3 Claims. (Cl. 43—19)

The present invention relates to a fishing line holding and line casting device characterized by a fishing rod having a reel seat at the inner or rearward end, a hand-grip which is preferably designed to resemble a pistol-grip, and a novel spring loaded hinging and operating connection between the upper end of the hand-grip and rearward end of the reel seat.

One object of the invention is to provide a simple, practical, convenient and compact mechanical baited line casting device wherein the construction is such that by folding and collapsing the rod, relative to the pistol-grip a construction of reduced proportions is then had and is capable of being satisfactorily sheathed and carried in a belt-attached holster of suitable size.

Experimental line casting devices which have been constructed in accordance with the invention and have been used under varying circumstances and conditions justify your applicant in calling attention to the fact that the instant invention has proved out to be highly satisfactory in construction and use, efficient and resultful in performance and otherwise such that it may be endorsed for adoption and use by rank and file fishermen who do not have the time, or perhaps patience, to acquire the skill necessary in manually handling and casting a baited fishing line in the customary manner.

In carrying out the preferred embodiment of the invention an unusually simplified spring-loaded hinge makes possible the folding of the structure into unusually compact form when being carried and removably stored in a holster. Also, the same novel hinge connection between the reel seat and upper end of the pistol-grip offers the user practical and reliable as well as readily responsive means which is readily and positively actuatable in achieving the desired automatic line casting result.

With the above and other objects, features and advantages in view the invention resides in certain novel features of construction, combination and arrangement of parts which will be hereinafter described in detail in the specification and particularly pointed out in the invention as claimed.

In the drawing:

Fig. 1 is a perspective view of the novel and improved fishing line casting device readied for fishing.

Fig. 2 is a top plan view, slightly enlarged and serving to reveal the particulars in construction.

Fig. 3 is a fragmentary side view with parts in section and elevation with the spinning reel and line omitted and wherein the construction and arrangements of parts is clearly shown.

With reference to the drawing the fishing rod is designated, as an entity, by the numeral 6. The rod section 8 is provided at the outer or forward end with a guide eye 10 for the fishing line 12 carried by the forwardly discharging spinning reel 14. The rod section is telescoped and removably secured in that portion 16 which constitutes the handle and which is suitably curved in shape and is connected to the reel seat 18 by way of a screw threaded portion 20 as seen in Fig. 3 which accommodates a retaining nut 22 for the cooperating end portion of the base 24 at the bottom of the attachable and detachable spinning reel. The other end of the base fits into a retaining recess or socket 26 provided therefor in the upstanding abutment 28 at the left or rear of the reel seat. At this same end the reel seat is provided with a downwardly curving depending finger-grip 30. Therefore, it will be generally evident that the rod, reel, line and reel seat are more or less conventional in construction. One improvement resides in providing the abutment 28 with a rearwardly projecting extension or lug 32. The rearward end of this lug is bifurcated and the furcations 34 serve to accommodate an end portion of a first hinge-leaf 36. The leaf is fitted between the furcations and firmly riveted or otherwise fixed in place as at 38. The rearwardly extending end portion of the leaf is provided with a pair of spaced parallel upstanding ears 40 which fit operatively between companion upstanding ears 42 on the adjacent end portion of the second hinge-leaf 44. These leaves 36 and 44 cooperate as shown and thus serve to accommodate an assemblying and hinging pin 46 which pierces the ears and is suitably fixed in place. The pin 46 in turn is encircled by a coil spring 48 which is fitted between the inner ears 40 and has its end portions stressed against the cooperating portions of the normally coplanar hinge-leaves 36 and 44 in the manner illustrated. The rear end 50 of the hinge-leaf 44 is fixedly secured in a suitably constructed socket 52 formed on the vertical upper end portion 54 of the upper part 56 of a hollow hand-grip 58. As before stated, this hand-grip may also be described as a pistol-grip. Therefore with this improved construction and arrangement the pistol grip is located rearwardly of but in proper cooperative relationship with the depending fingerpiece or finger-grip 30. It follows that the pistol-grip is hingedly joined to the adapter lug 32 at the rear of the reel seat 18 by way of an intervening folding and mechanically functioning spring-loaded hinge. The hinge obviously allows the rod 6 to be folded or collapsed relative to the pistol-grip. Therefore, it is possible to bring these two rod parts into close angular association and to place the then folded rod, as an entity, in a carrying holster (not shown). In practice the holster will be made up properly to accommodate this collapsed ready-to-use casting device. By keeping the device in the holster it may be readily carried in one's car and later connected to one's belt so that it will be safe, convenient and out-of-the-way. By withdrawing it in its folded state from the holster and applying the rod section 8 the device is then ready for casting. The pistol-grip may be held in one hand and the other hand engaged with the handle 16. Then the joint may be "broken" and the rod 6 folded up and toward the user in a manner to place the spring hinge under tension. Then, when the user "lets go" the rod springs forwardly and downwardly and serves to catapult the baited line to the desired fishing spot in an obvious manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use by an angler when casting a baited fishing line; a mechanical line casting device comprising a fishing rod having at least one line retaining and guiding eye at the forward end thereof, a reel seat at the rearward end, said reel seat being provided with a lateral depending finger-grip, a hand-grip lateral to the longitudinal axis of said rod and spaced rearwardly of and generally parallel to said finger-grip, said reel seat being provided at its rearward end with a fixed first hinge-leaf, the upper end of said hand-grip being provided at its upper end with a second hinge-leaf complemental to and aligned with said first hinge-leaf, the adjacent ends of said hinge-leaves having upstanding interfitting ears, a hinge-pin mounted in said ears, and a coil spring encircling the pin, confined between the ears and having its pressure responsive ends engaging the respective cooperating hinge-leaves.

2. For use by an angler when casting a baited fishing line; a mechanical line casting device comprising a fishing rod having at least one line retaining and guiding eye at the forward end thereof, a reel seat located at the rearward end of said rod, said reel seat being provided at a rearward end with a lateral depending hook-shaped finger-grip, a hand-grip lateral to the longitudinal axis of said rod and spaced rearwardly of and generally parallel to said finger-grip, said hand-grip being shaped like a pistol-grip for easy-handling usage, and spring-loaded hinge means providing a folding and pivoting structural connection between the upper end of the hand-grip and rear end of the reel seat, the axis of rotation of the hinge means being horizontal and said rod being swingable vertically through an arcuate path from a manually held upstanding retracted ready-to-cast position to a projected forward casting and fishing position while the device is being held and handled by way of the hand-grip, a front delivery spinning reel removably mounted for operation in said reel seat, and a fishing line carried by the reel and extending along the rod and forwardly through and beyond said guiding eye.

3. The structure defined in claim 2 and wherein said spring-loaded hinge means comprises a first hinge-leaf fixed to a lug carried by a rear portion of said reel seat, a second similar hinge-leaf normally coplanar with the first named hinge-leaf and fixedly secured to an upper end of the hand-grip, said hinge-leaves being pivotally joined together by a spring loaded hinge pin.

References Cited in the file of this patent

UNITED STATES PATENTS

| | | |
|---|---|---|
| 764,853 | Kimberlin | July 12, 1904 |
| 1,140,608 | Phillips | May 25, 1915 |
| 2,765,568 | Kozar | Oct. 9, 1956 |